United States Patent

Krau et al.

[11] Patent Number: 5,864,698
[45] Date of Patent: Jan. 26, 1999

[54] DISK BASED BIOS

[75] Inventors: Michael Paul Krau; Donald William Gohr, both of Benton Harbor, Mich.

[73] Assignee: Packard Bell NEC, Sacramento, Calif.

[21] Appl. No.: 932,808

[22] Filed: Sep. 15, 1997

Related U.S. Application Data

[63] Continuation of Ser. No. 295,508, Aug. 24, 1994, abandoned.

[51] Int. Cl.⁶ .................................................. G06F 9/445
[52] U.S. Cl. ................................................ 395/652
[58] Field of Search ............................................. 395/652

[56] References Cited

U.S. PATENT DOCUMENTS

| | | | |
|---|---|---|---|
| 4,928,237 | 5/1990 | Bealkowski et al. | 395/653 |
| 5,022,077 | 6/1991 | Bealkowski et al. | 380/4 |
| 5,063,496 | 11/1991 | Dayan et al. | 395/186 |
| 5,072,370 | 12/1991 | Durdik | 395/184.01 |
| 5,128,995 | 7/1992 | Arnold et al. | 380/4 |
| 5,136,713 | 8/1992 | Balkowski et al. | 395/652 |
| 5,187,792 | 2/1993 | Dayan et al. | 395/652 |
| 5,230,052 | 7/1993 | Dayan et al. | 395/652 |
| 5,257,380 | 10/1993 | Lang | 711/166 |
| 5,327,531 | 7/1994 | Bealkowski et al. | 395/651 |
| 5,355,489 | 10/1994 | Bealkowski et al. | 395/652 |
| 5,388,267 | 2/1995 | Chan et al. | 395/652 |
| 5,410,699 | 4/1995 | Bealkowski et al. | 395/652 |
| 5,410,707 | 4/1995 | Bell | 395/652 |
| 5,418,918 | 5/1995 | Vander Kamp et al. | 395/652 |
| 5,465,357 | 11/1995 | Bealkowski et al. | 395/652 |
| 5,471,674 | 11/1995 | Stewart et al. | 395/652 |
| 5,473,775 | 12/1995 | Sakai et al. | 395/652 |
| 5,481,713 | 1/1996 | Wetmore et al. | 395/705 |
| 5,488,741 | 2/1996 | Oka | 395/652 |
| 5,495,611 | 2/1996 | Bealkowski et al. | 395/652 |
| 5,497,490 | 3/1996 | Harada et al. | 395/653 |
| 5,579,522 | 11/1996 | Christenson et al. | 395/652 |
| 5,692,190 | 11/1997 | Williams | 395/652 |
| 5,694,600 | 12/1997 | Khenson et al. | 395/652 |

FOREIGN PATENT DOCUMENTS 0479427  4/1992  European Pat. Off. ........ G06F 9/445

*Primary Examiner*—James P. Trammell
*Assistant Examiner*—John Q. Chavis
*Attorney, Agent, or Firm*—Fitch, Even, Tabin & Flannery

[57] ABSTRACT

A method and apparatus enables the BIOS to be stored on a mass storage device, such as a hard disk, to enable a computer system to be booted even during conditions of disk failure. A fully functional version of the BIOS, such as a first production version of the BIOS, provided on a non-volatile memory device, such as a MASKED ROM memory device or a one time programmable (OTP) memory device, is used to initially boot the computer system. An upgraded or newer version of the BIOS may be loaded into an unprotected area of the hard disk by way of a floppy disk. Initially, during installation, the system checks to determine if the upgraded version of the BIOS is compatible with the computer system and newer than the BIOS version currently stored in the computer system. If so, the upgraded BIOS is copied to the hard disk and treated like any other file. After the BIOS is copied to the hard disk, the system is rebooted to install the upgraded version of the BIOS. In the event of a disk crash, the fully functional or first production version of the BIOS in the OTP device enables the computer system to be rebooted and diagnostics to be run in order to ascertain the cause of the disk failure. By utilizing a fully functional or first production version of the BIOS stored in an OTP device for initial startup, the production cycle for manufacturing a personal computer can be reduced, as well as providing optimal utilization of OTP devices.

16 Claims, 3 Drawing Sheets

DISK BASED BIOS

This application is a continuation of application Ser. No. 08/295,508 filed Aug. 24, 1994, now abandoned.

BACKGROUND OF THE INVENTION

CROSS-REFERENCE TO RELATED APPLICATION

The following application is related to co-pending application, entitled "Flash ROM Programmer," by Clark Buxton, Ser. No. 07/885,805, filed on May 15, 1992 and co-pending application, entitled "Memory System," by Min E. Lee and Jiming Sun, Ser. No. 07/995,803 filed on Dec. 23, 1992.

1. Field of the Invention

The present invention relates to a method and apparatus for upgrading a Basic Input Output System (BIOS) for a computer system stored on a system mass storage device, such as a disk drive, without changing any hardware which obviates the need for partitioning the disk or providing for disaster recovery which enables the computer system to be booted in the event of a disk failure.

2. Description of the Prior Art

Various methods and systems are known for upgrading the BIOS in a computer system. In earlier personal computers, the BIOS was loaded into a programmable read only memory (PROM) or an ultraviolet erasable electrically programmable ROM (EPROM). In such systems, since the BIOS is very hardware specific, any changes in the computer hardware normally required the BIOS to be upgraded. Such upgrades required that the computer case be opened and the PROM or EPROM chip containing the BIOS to be removed and replaced with a new PROM or EPROM chip containing the updated BIOS. In such a situation, the replacement of the BIOS was known to require the services of a computer technician which can be relatively expensive.

In other known systems, such as the system disclosed in co-pending application, Ser. No. 07/995,803, filed on Dec. 23, 1992, assigned to the same Assignee as the Assignee of the present invention, the BIOS is loaded into flash ROM. Flash ROM is relatively expensive, which drives up the cost of the computer system. In addition, the boot block portion of the flash ROM has a limited size which limits the number of BIOS functions that can be stored. Such flash ROMs also require programming circuitry which, inter alia, requires a 12-volt programming voltage in order to program the flash ROM in contradistinction to a ROM or EPROM which does not require programming circuitry, since such devices are normally programmed outside the computer system. Moreover, relatively complex disaster recovery is required to enable the system to be rebooted in the event of a failure of the flash ROM device.

In yet other known systems, the BIOS is loaded into a protected area of a hard disk. Examples of such systems are disclosed in U.S. Pat. Nos. 4,928,237; 5,022,077; 5,063,496; 5,072,370; 5,128,995; and 5,136,713, as well as European Patent Application No. 0 479 427 A2, all herein incorporated by reference. In such systems, basic start-up BIOS functions are provided on a ROM with the balance of the BIOS function stored on the hard disk and written to main memory during the start-up sequence. In such an application, the BIOS is normally loaded onto a protected area of the hard disk, thus reducing the disk space available for other applications. In addition, such computer systems will not boot when the hard drive fails in such systems. As such, no diagnostic utilities can be utilized to ascertain the source of the disk failure.

In order to reduce costs, it is also known to utilize a MASKED ROM, fabricated with the BIOS code already stored, also known as a MASKED device. Such MASKED devices are relatively inexpensive and obviate the need for programming circuitry. However, the use of such MASKED devices can have a dilatory impact on the development and production schedule of a computer system due to the relatively long lead time (i.e., 6-8 weeks) to obtain such devices, often necessitating the use of the more expensive memory devices such as one time programmable (OTP) memory devices which typically cost less than EPROM, EEPROM and flash ROM memory devices. More particularly, since the MASKED and OTP devices cannot be reprogrammed after fabrication, the commercial version of MASKED devices are normally ordered relatively late in the production cycle of a computer system. The relatively long lead time of such MASKED devices thus undesirably extends the development and production cycle of the computer system into which the MASKED device is being incorporated. In addition, since such MASKED devices are normally ordered in relatively large quantities, many of such devices normally end up as surplus.

SUMMARY OF THE INVENTION

It is an object of the present invention to provide a method and apparatus for enabling the BIOS in a computer system to be updated rather quickly and easily.

It is yet another object of the present invention to enable the BIOS to be updated without the replacement of any hardware.

It is yet another object of the present invention to provide a system and apparatus for enabling the BIOS to be stored on a system mass storage device.

It is yet another object of the present invention to provide a method and apparatus for storing the BIOS on a mass storage device which obviates the need for providing a disk partition and also obviates the need for additional hardware and software to enable recovery of the system in the event of a failure of the mass storage device.

It is yet another object of the invention to streamline the production cycle of a personal computer.

It is yet a further object of the present invention to optimize the usage of MASKED devices used in a computer system.

It is yet another object of the invention to obviate the need for programming circuitry for memory devices incorporating BIOS functions.

Briefly, the present invention relates to a method and apparatus which enables the BIOS to be stored on a mass storage device, such as a hard disk, to enable a computer system to be booted even during conditions of disk failure. A fully functional version of the BIOS, such as a first production version of the BIOS, provided on a non-volatile memory device, such as a MASKED ROM device or a one time programmable (OTP) memory device, is used to initially boot the computer system. An upgraded or newer version of the BIOS may be loaded into an unprotected area of the hard disk by way of a floppy disk. Initially, during installation, the system checks to determine if the upgraded version of the BIOS is compatible with the computer system and newer than the BIOS version currently stored in the computer system. If so, the upgraded BIOS is copied from the hard disk (where it is treated like any other file) and copies to memory. After the BIOS is copied from the hard disk, the system is rebooted to install the upgraded version of the BIOS. In the event of a disk crash, the fully functional or first production version of the BIOS in the ROM device enables the computer system to be rebooted and diagnostics to be run in order to ascertain the cause of the disk failure. By utilizing a fully functional or first production version of the BIOS stored in an ROM device for initial startup, the production cycle for manufacturing a personal computer can be reduced, as well as providing optimal utilization of the MASKED devices.

DETAILED DESCRIPTION OF THE DRAWING

These and other objects of the present invention will be readily understood with respect to the following specification and attached drawing wherein.

DETAILED DESCRIPTION OF THE PREFERRED EMBODIMENT

Figures 1, 4:
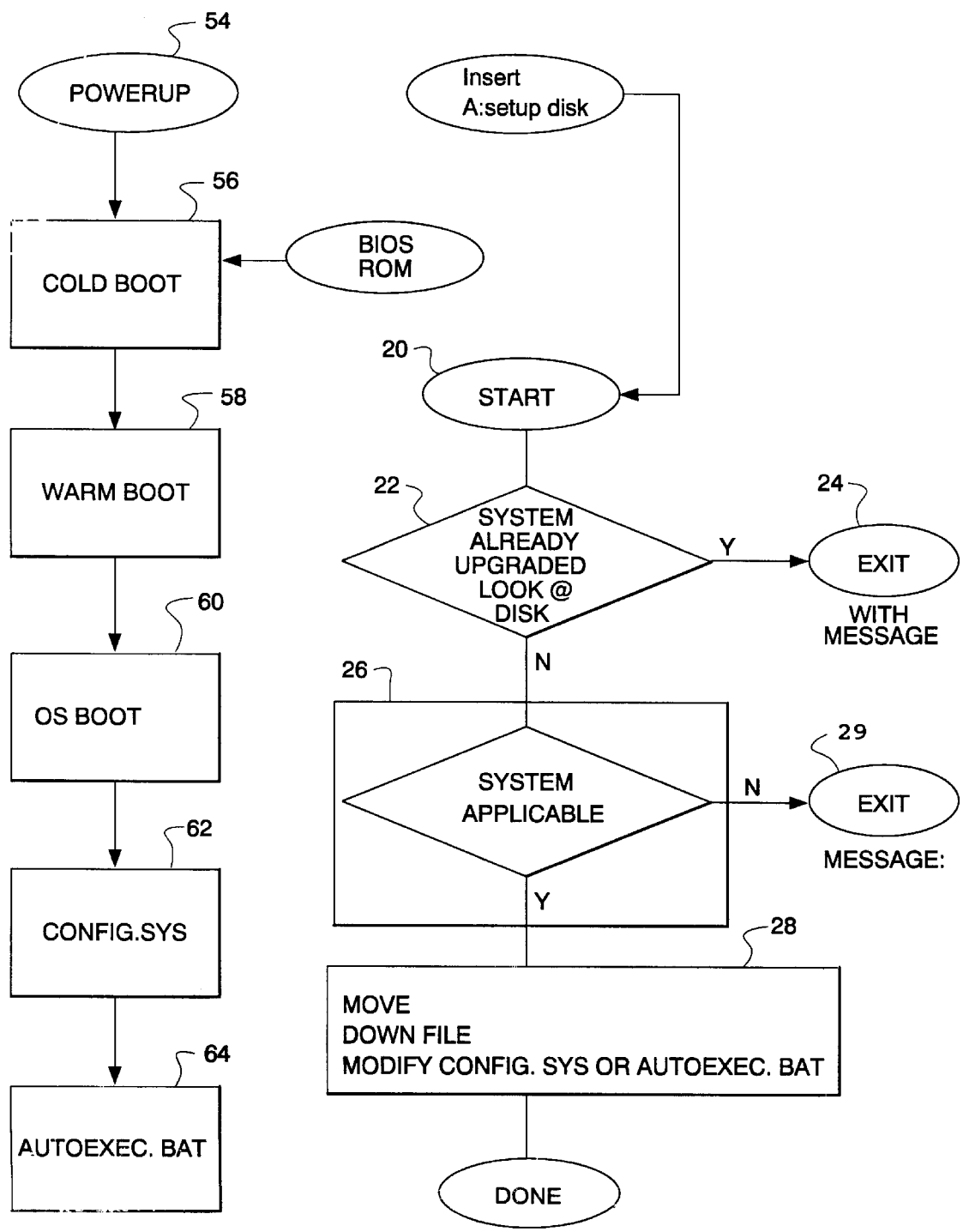
FIG. 1 is a block diagram of a system for determining whether the BIOS should be upgraded in accordance with the present invention.
FIG. 4 is a block diagram illustrating a typical boot sequence of a computer system.

The present invention relates to a method and apparatus for upgrading a Basic Input/Output System (BIOS) of a computer system, such as a personal computer or a personal server, such as a Z-STOR personal server as manufactured by Zenith Data Systems Corporation of Buffalo Grove, Ill. The upgradable BIOS is stored in a mass storage device, such as disk drive, where it is treated as an ordinary file which obviates the need for partitioning the disk and, thus, optimizes disk storage space while a fully functional version of BIOS is stored in a non-volatile memory device other than the mass storage device. An important aspect of the invention is that the computer system can be rebooted in the event of a disk failure without the need for disaster recovery provisions. As such, an computer systems utilizing the principles of the invention can run diagnostic utilities, such as Norton utilities, after a disk failure to ascertain the source of the problem.

In accordance with an important aspect of the invention, the development and production cycle of a computer system can be reduced even though BIOS upgrades are necessitated during the cycle. More particularly, in a typical production cycle for a computer system, the BIOS takes about 6-9 months to develop. During the course of such development, several factors can result in the need to modify the BIOS which adds to the product development cycle which heretofore further delayed the point in the production cycle at which preprogrammed memory devices for the BIOS, such as MASKED memory devices, can be ordered. For example, the BIOS is often modified to support ambiguities and non-conformances to specifications in the hardware design. In particular, when the hardware design does not match performance expectations through oversight, part substitution or other factors, updating of the BIOS is usually the least expensive way to correct for the hardware design, particularly in light of the trend towards soldering down all hardware in the system. In addition, in certain situations, even when the hardware design meets the specifications, as well as performance expectations, a new software feature may be added late in the production cycle. Such software features normally reside in BIOS. Moreover, even with the most advanced testing procedures and exhaustive validation and verification techniques, some glitches in the BIOS are not detected until the computer system has been shipped to the field. In such a situation, the BIOS must be upgraded in the field. Such field upgrading has heretofore not only cumbersome, but relatively expensive.

By utilizing a fully functional or first production version of the BIOS in a non-volatile memory device, such as an MASKED device, for booting the computer system and utilizing a mass storage device, such as a hard disk for upgrades, such BIOS upgrades have a minimal impact on the development and production cycle of a computer system. In particular, by utilizing a first production version of the BIOS in an MASKED device, the MASKED devices can be ordered relatively earlier in the production cycle. More particularly, since the lead time for such MASKED devices is normally six to eight weeks, rather than waiting until relatively late in the production cycle, the present invention enables the MASKED devices to be ordered much earlier, thus reducing the overall production cycle for the computer system. Any BIOS changes resulting from hardware or software debugging or additional software features being added can be made relatively easily to the BIOS file stored on the mass storage device. Moreover, since the first production version of the BIOS stored on the MASKED devices is fully functional, the computer system can be rebooted in the event of a disk failure, thus enabling diagnostic utilities to be run for oscillating the source of the failure.

In addition, the method and apparatus in accordance with the present invention provides for optimal use of the MASKED devices. More particularly, MASKED devices are normally ordered in mass quantities. Since the MASKED devices are not erasable, surplus MASKED devices have heretofore been known to be discarded. The method and apparatus in accordance with the present invention enables such surplus MASKED devices to be utilized until the supply is exhausted, thus reducing the need to discard such MASKED devices; thereby reducing the overall costs of the computer system. In particular, since the BIOS in the surplus MASKED devices is fully functional, these MASKED devices can be used in subsequent systems and upgraded in accordance with the present invention.

As will be discussed in more detail below, the present invention enables the computer system to be booted up through the operating system which, in turn, calls a program to upgrade the BIOS, if appropriate, and slush (i.e, copy) it to the main memory. The system is then rebooted so that the upgraded BIOS is installed in the proper memory address space. There are, however, safeguards within the system to prevent upgrading of the BIOS if: the computer system is from a different vendor; the computer system is of a different model; or the computer system has already been upgraded with a BIOS version as recent or more recent than the version in the upgrade program. Since the program is fairly straight-forward, it can be recompiled for different operating systems, thus facilitating use of the program with different computer systems.

In accordance with the present invention, the BIOS upgrade can be installed rather quickly and easily, and with little understanding of the system by the installer. The software for the system is included as an Appendix. The installation program is illustrated in FIG. 1. It is contemplated that the upgrade may be made available by way of a floppy disk. Thus, the floppy disk is inserted, for example, in floppy drive A in step 20. The installation process may be initiated by typing, for example, "A: SETUP." The system first determines whether an upgrade is necessary in steps 22 and 24 by determining whether the BIOS version on the floppy disk is a newer version than the version currently stored on the hard drive, as will be discussed in more detail below. If the upgrade has already been copied to the hard drive, the system will exit in step 24 and display a message to that effect. If the upgrade has not been previously copied to the drive, the system will determine in step 26 if it is applicable to the particular computer system in which the floppy disk has been inserted. If not, the system will exit in step 29 and display an appropriate message. If the system is applicable, the system will proceed to step 28 and copy the file from the floppy drive to the hard drive, and modify either the CONFIG.SYS or AUTOEXEC.BAT file in order to initiate the installation of the upgrade programs illustrated in FIGS. 2 and 3.

Figure 2:
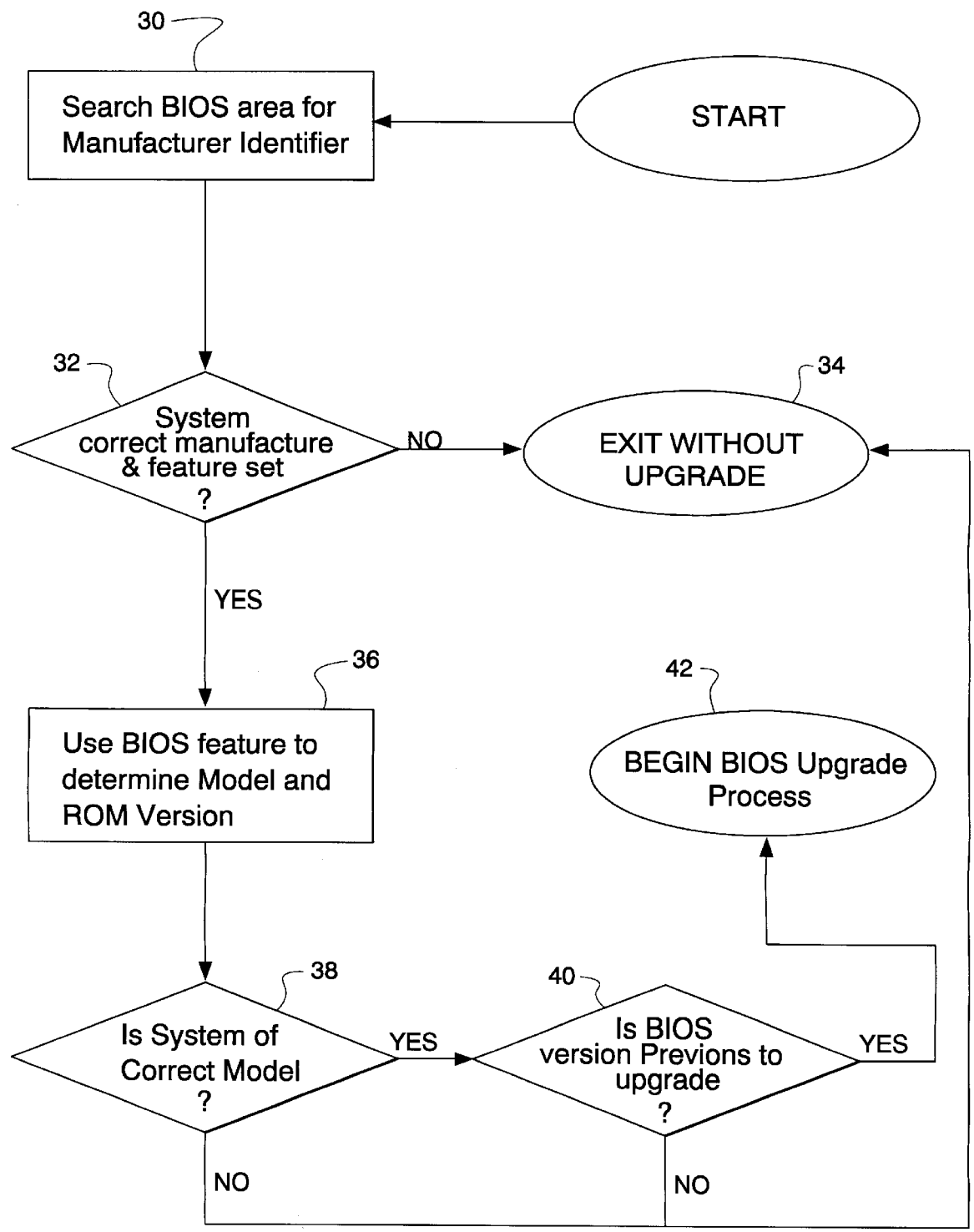
FIG. 2 is a block diagram of a system for upgrading the BIOS in accordance with present invention.

After the upgraded version of the BIOS is copied to the hard disk, the system next ascertains in FIG. 2 whether the upgrade is necessary relative to the BIOS stored in the MASKED (or ROM) memory device. If an upgrade is attempted without such a validation, the system could be configured with an invalid BIOS for its operation, thus making a power-up reset necessary to restart the system. As will be discussed in more detail below, the program illustrated in simplified form in FIG. 2 can be initiated during various stages of the boot process which will be discussed below. However, once the program is started, the first production version of the BIOS stored in the MASKED (or ROM) memory device is searched for a manufacturer identifier of the computer system in step 30. In computer systems manufactured by Zenith Data Systems Corporation, the system searches the ZBIOS code; ZBIOS being a Zenith Data Systems Corporation BIOS extension which includes functions not included in the standard BIOS specification, including functions to determine the revision level and actual model identification. ZBIOS is available from Zenith Data Systems Corporation in Buffalo Grove, Illinois. The system next determines in step 32 if the manufacturer identifier found in the production version of the BIOS stored in the MASKED (or ROM) memory device matches the manufacturer identifier for the upgrade in step 34. If the manufacturer identifier of the system does not match the manufacturer identifier of the upgrade, there is no reason to continue the process since the BIOS cannot be upgraded by this utility. As such, during such a condition, the system exits in step 34 and displays a message to that effect. If the manufacturer identifier for the computer system, as found in the first production version of BIOS stored in the MASKED device, matches the manufacturer identifier for the upgrade, the system next determines in step 36 the model number of the computer system and the current version of BIOS in that system. In computer systems manufactured by Zenith Data Systems Corporation, the model number of the computer system, as well as the BIOS version, is ascertained by calls to the ZBIOS extension discussed above. The data returned from the ZBIOS extension reflects the model number of the computer system and the BIOS version stored in the MASKED (or ROM) memory device. These values are compared with parameters internal to the program in steps 38 and 40. If the model number of the computer system returned from the MASKED (or ROM) memory device matches with the model number of the upgrade and the BIOS version stored in the MASKED (or ROM) memory device is an older version than the upgrade, the BIOS upgrade process is initiated in step 42. Otherwise, there is no need to continue and the program is terminated without upgrading the system while displaying appropriate messages.

Figure 3:
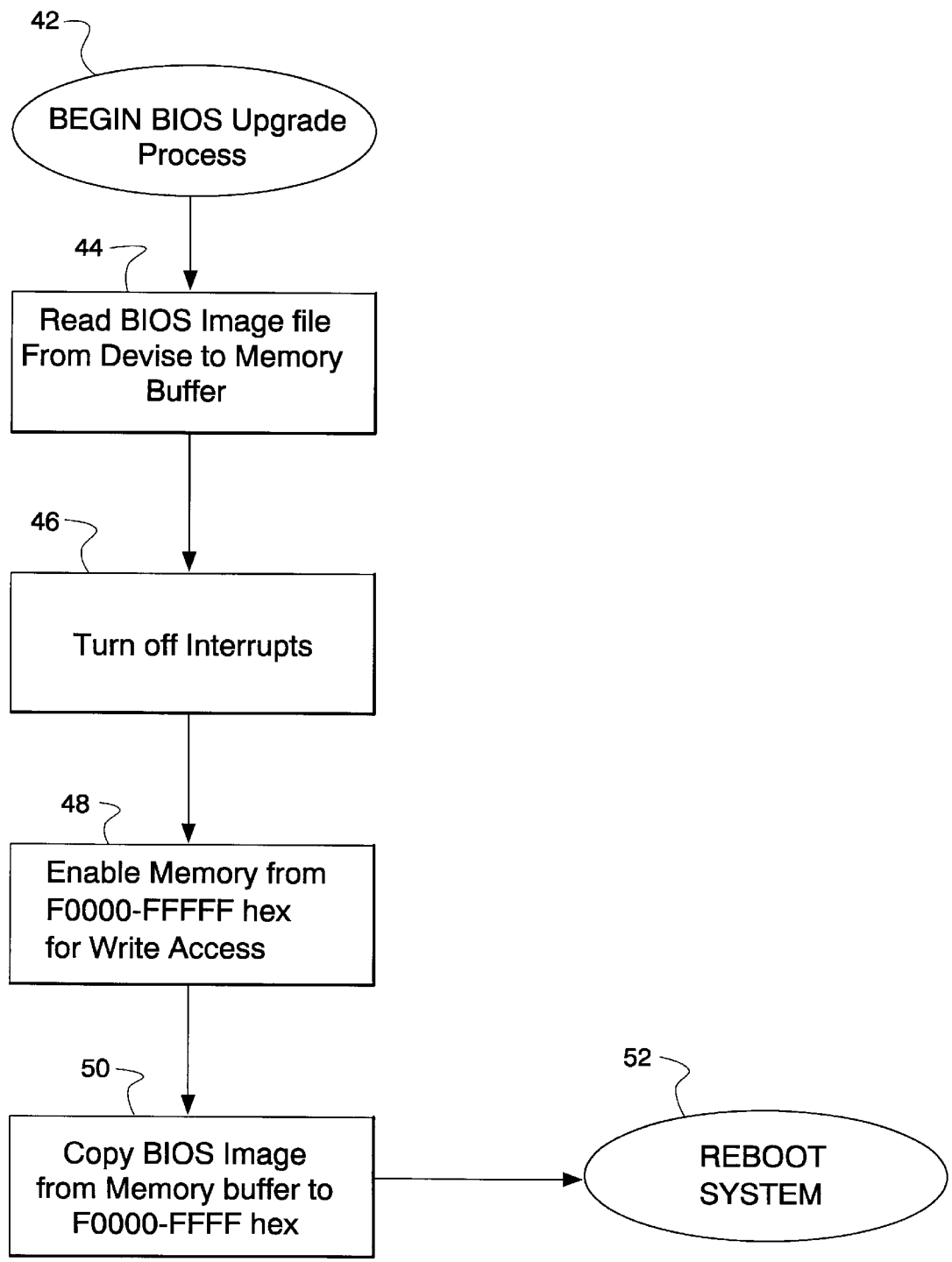
FIG. 3 is a block diagram illustrating the installation of the BIOS upgrade in accordance with the present invention.

Once the need to upgrade the BIOS in the MASKED device is completed, the BIOS is installed as illustrated in FIG. 3. Since later in the process the interrupts are disabled, it is necessary to perform all interrupt intensive processes as early in the process as possible. Thus, the BIOS upgrade image stored in the mass storage device is written to a memory buffer in step 44. Subsequent to writing the BIOS image file to the memory buffer, the interrupts are turned off in step 46 since many interrupt handling routines reside in the BIOS. Failure to turn off the interrupts could result in the system executing code from the wrong memory addresses. In particular, should an interrupt occur during the BIOS upgrade process, the system could try to service it. During such a situation, the interrupt vector pointing to the support code (located outside the BIOS space) could start execution at some point in the upgrade. However, that location may not necessarily be the support code for that interrupt in the upgrade code. As such, such a situation could cause the system to execute code haphazardly requiring a power reset.

Normally, during a cold boot, the BIOS code is stored in the MASKED (or ROM) memory device at physical memory addresses $FFFF0000 to $FFFFFFFF and slushed to physical addresses $0F0000 to $0FFFFF in the volatile main memory. However, in step 48, it is first necessary to enable those memory locations in the main memory, normally under the control of the system memory controller; disclosed in detail in the accompanying technical manuals for the computer system. For computer systems manufactured by Zenith Data Systems Corporation, such as a Z-STOR Personal Server, reference may be made to "Z-STOR Personal Server Setting Up Guide," copyright 1993 and "Z-STOR Personal Server Software User's Guide," copyright 1993, available from Zenith Data Systems Corporation in Buffalo Grove, Ill., hereby incorporated by reference, for instructions relating to the memory controller and enabling memory addresses.

At this point, the system is now ready to move the BIOS image from the memory buffer into the BIOS address space $0F0000 to $0FFFFF in volatile memory. Once the BIOS image file from the memory buffer is written to the BIOS address space, the upgrade is complete until either a power-down condition or a cold boot is requested. However, although the BIOS is upgraded once the BIOS image file from the memory buffer is written to the BIOS address space, the BIOS is not installed at this point. Installation requires that the upgraded BIOS to perform its own initialization processes including the installation of its own interrupt vectors in any hardware specific programming. Thus, in step 42, the system is rebooted either by way of a cold boot or a warm boot. By default, the reboot may be a warm boot, thus obviating the need to reinstall the old BIOS contained in the MASKED (or ROM) memory device as in a standard cold boot.

An important consideration is that all BIOS versions of the same model must have the same "landing zone" for a warm boot; all warm boots begin at the exact same memory address for all versions of the BIOS. This is necessary since the reboot will begin execution out of the ROM address space (i.e., addresses $FFFF000 through $FFFFFFFF. During such a condition, when the ROM based code (i.e, first production version of BIOS stored in the MASKED device) determines to the boot to be a warm boot, it will initiate a jump to memory addresses $0F0000 through $0FFFFF. That jump will be based on the version of BIOS resident in the ROM. Therefore, it is necessary for all BIOS to begin the warm boot code at the same physical address, thus ensuring that the ROM code will jump to the correct place for all versions of BIOS.

The program for upgrading the BIOS illustrated in FIGS. 2 and 3 may be called at different points during the boot-up process, as will be explained below. A typical sequence for a boot process is illustrated in FIG. 4. In particular, once the system is powered-up in step 54 from a powered-down condition, a cold boot process is initiated in step 56. The code for this portion of the boot process is executed out of the ROM (MASKED, OTP or the like) device. During this process, various tasks are completed, such as initializing hardware, and sizing and testing the main memory. In addition, the BIOS code from the ROM (MASKED or OTP) device is also slushed to the volatile main memory. Once the BIOS is slushed to the main memory, the BIOS code is then executed from the main memory and the system begins its warm boot procedures in step 58. The warm boot procedures include testing memory; initializing peripherals; slushing any ROM-based codes for any peripherals; and initiating an operating system boot in step 60. The operating system boot searches for the boot sector first on the floppy drives; and, if none are found, on the hard drive. As part of the operating system boot, two programs, CONFIG.SYS (62) and AUTOEXEC.BAT (64) are executed. The call for the BIOS validation program illustrated in FIG. 2 can be initialized either from the CONFIG.SYS file or the AUTOEXEC.BAT file.

Obviously, many modifications and variations of the present invention are possible in light of the above teachings. Thus, it is to be understood that, within the scope of the appended claims, the invention may be practiced otherwise than as specifically described above.

What is claimed and desired to be secured by a letters patent in the united states is:

APPENDIX

```
#include <stdio.h>
#include <stdlib.h>
#define ver_length 3
FILE    *fdr;
static int (*zbios)( );
static char   *argv;
static char   *argf;
void    reboot(void) {
        int  i;
        for(i=0;i < 0x3fff;i++);
}
void    Close_memory(void) {
        asm  xchg  al,ah
}
void    Open_memory(void) {
        asm  xchg  al,ah
}
void *zbios_address( void )
{
    unsigned long addr;
    unsigned char *zbios_label;
    zbios_label = (char *) 0xf000ffe3L;
    addr = NULL;
    else
    {
        addr = ((unsigned) *(zbios_label + 6) << 8) + *(zbios_label + 5);
        addr += 0xf0000000L;
    }
    return( (void * ) addr );
}
int ver_ok( void )
{
    int carry;
    int num,i,d;
```

APPENDIX-continued

```
    char *s;
    d = 0;
    i=0;
    carry = 0;
    asm   mov   num, cx;
    asm   mov   cx, 12;
    asm   mov   s,bx;
    asm   shl   ax,cl;
    asm   mov   s+2,ax;
    i = 1;
    num = 0;
    d = -1;
done;
    while (num > i) {
        if (s[i] > argv[i]) {
            i = num+1;
            d = 1;
        }
        else if (s[i] == argv[i]) ++i;
        else if (s[i] < argv[i]) {
            d = -1;
            i = num +1;
        }
    }
    if ((num < ver_length) && (d == 0)) d = -1;
    if (d < 0) i = 1;
    else i = 0;
    return(i);
}
int model ( void )
{
    int carry;
    int num,i;
    char *s;
    char *st;
    i=0;
    st = "ARMSTRNG";
    carry = 0;
    asm   mov   num, cx;
    asm   mov   cx, 12;
    asm   mov   s,bx;
    asm   shl   ax,cl;
    asm   mov   s+2,ax;
    i = 1;
    num = 0;
done;
    while (!carry) {
        if (s[i] == st[i]) ++i;
        else i = num+20;
        if (i >= num) ++carry ;
    }
    if (i == num) i = 1;
    else i = 0;
    return(i);
}
int   Test_for_load(void) {
    int   x;
    x = 0;
    if(model( )) {
        if (ver_ok( )) {
            x = 1;
        }
        else {
            pritnf("Rom version does not require Update!\n\n");
        }
    }
    else {
        printf("System Not a ZSTOR system!!!\n\n");
    }
    return(x);
}
void  Transfer(void) {
    unsigned char   *buffer;
    unsigned in i,readcnt;
    unsigned char *bios_loc;
    bios_loc = ( char * ) 0xf0001000L;
    buffer = (char *) malloc(0xF000);
    printf("   Reading file image\n");
    readcnt = fread(buffer,sizeof(char),0xf000,fdr);
```

APPENDIX-continued

```
    fclose(fdr);
    (printf("     File image read %X Characters\n",readcnt);
    for(i=0;i < readcnt; ++i) {
    asm   mov   al,1;
    asm   out   0xe0,al;
      *(bios_loc + i) = *(buffer + i);
    asm   mov   al,7;
    asm   out   0xe0,al;
    }
}
main( )
{
    argf = "zstor_4.3a";
    argv = "43A ";
    if((fdr = fopen(argf,"rb")) == (FILE *)NULL) {
        fprint(stderr, "fopen; opening %s\n", argf);
        exit(1);
    }
    printf("NewBIOS - ZSTOR BIOS Modification program - Version
1.1\n\n");
    zbios = zbios_address( );
    if (Test_for_load( ) != 0) {
        Open_memory( );
        printf("NewBIOS - Processing now !!\n\n");
        Transfer( );
        Close_memory( );
        reboot( );
    }
    else printf("NewBIOS non-applicable!!!\n\n");
}
```

What is claimed is:

1. A system for enabling an initial version of a basic input output system (BIOS) stored on a predetermined memory device in a predetermined computer system to be upgraded without removal or reprogramming of the predetermined memory device, the predetermined computer system having a volatile memory and a mass storage device, such as a hard disk drive, the system comprising:

means for booting the computer system using the initial version of the BIOS from the predetermined memory device, wherein the initial version of the BIOS is fully functional for enabling the computer system to be booted to an operational state during a failure of the mass storage device;

means for enabling the storage of an upgraded version of the BIOS on the mass storage device;

means for loading said upgraded BIOS from the mass storage device into predetermined address locations in the volatile memory during predetermined conditions; and means for enabling the computer system to be automatically rebooted and execute said upgraded BIOS from said predetermined address locations in the volatile memory subsequent to said upgraded BIOS being loaded into the volatile memory.

2. A system as recited in claim 1, wherein said upgraded BIOS is stored in a predetermined mass storage device.

3. A system as recited in claim 2, wherein said predetermined non-volatile memory device is a MASKED memory device.

4. A system as recited in claim 1, wherein said enabling means includes means for determining one or more predetermined characteristics of said first predetermined version of said BIOS and comparing the same with corresponding characteristics of a second predetermined upgraded version of BIOS.

5. A system as recited in claim 4, wherein one of said predetermined characteristics is the manufacturer of said computer system.

6. A system as recited in claim 4, wherein one of said predetermined characteristics is the model number of said computer system.

7. A system as recited in claim 4, wherein one of said predetermined characteristics is the version number of said BIOS.

8. A system as recited in claim 1, wherein said enabling means includes means for copying an upgraded version of BIOS from a floppy disk to the mass storage device under predetermined conditions.

9. A system as recited in claim 8, further including means for installing said upgraded version of BIOS.

10. A system as recited in claim 1, wherein said enabling means includes means for copying said upgraded version of BIOS from an external device such as a floppy disk to the mass storage device.

11. A system as recited in claim 1, wherein said enabling means includes means for rebooting the computer system after said upgraded version of BIOS is copied to said predetermined address location in the volatile memory space.

12. A method for enabling the basic input output system (BIOS) to be updated in a predetermined computer system having a volatile memory and a mass storage device, such as a disk drive, the method comprising the steps of:

(a) providing a first predetermined version of BIOS stored in predetermined non-volatile memory, said first predetermined version of BIOS said computer system to be booted to an operational state during conditions of failure of said mass storage device;

(b) providing means for enabling the storage of an upgraded version of BIOS to be copied to the mass storage device under predetermined conditions; and (d) installing said upgraded version of BIOS in said computer system by loading said upgrade BIOS into the volatile memory at predetermined address locations during predetermined conditions to enable the resident BIOS to cause the computer system to be rebooted and execute said upgraded version of BIOS from said predetermined address locations in said volatile memory subsequent to said upgraded BIOS being loaded into the volatile memory.

13. A system as recited in claim 1, further comprising:

means for disabling at least one interrupt prior to loading said upgraded BIOS into the predetermined address locations.

14. A system as recited in claim 1, further comprising:

means for enabling the initial version of the BIOS to initiate BIOS execution at said predetermined address locations upon detecting a warm boot.

15. A method of upgrading basic input output system (BIOS) software in a computer system having a volatile memory, non-volatile memory, and a mass storage device, comprising:

providing an initial version of BIOS stored in the non-volatile memory, said initial version of BIOS being capable of enabling the computer system to be booted to a operational state during failure of the mass storage devices;

storing an upgraded version of BIOS on the mass storage device subject to at least one predetermined condition;

storing said upgraded version of BIOS in a memory buffer;

disabling at least one interrupt; and installing said upgraded version of BIOS into the computer system by transferring said upgraded BIOS from said buffer memory to the volatile memory subsequent to disabling the interrupts.

16. The method of claim 15, wherein said initial version of BIOS disables said at least one interrupt.

* * * * *

UNITED STATES PATENT AND TRADEMARK OFFICE
CERTIFICATE OF CORRECTION

PATENT NO. : 5,864,698
DATED : January 26, 1999
INVENTOR(S) : Krau et al.

It is certified that error appears in the above-indentified patent and that said Letters Patent is hereby corrected as shown below:

Column 10, line 31:  delete "(d)" and insert --(c)-- therefor.

Column 10, line 53:  delete "a" and insert --an-- therefor.

Signed and Sealed this

Fifteenth Day of June, 1999

Attest:

Attesting Officer

Q. TODD DICKINSON

Acting Commissioner of Patents and Trademarks